(12) United States Patent
Iwamoto (10) Patent No.: US 10,989,958 B2
(45) Date of Patent: Apr. 27, 2021

(54) DISPLAY DEVICE COMPRISING A CONTROL SUBSTRATE CONFIGURED TO CONTROL DRIVE OF DISPLAY PIXELS

(71) Applicant: SHARP KABUSHIKI KAISHA, Sakai (JP)

(72) Inventor: Akihisa Iwamoto, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/818,122

(22) Filed: Mar. 13, 2020

(65) Prior Publication Data

US 2020/0301180 A1 Sep. 24, 2020

Related U.S. Application Data

(60) Provisional application No. 62/821,759, filed on Mar. 21, 2019.

(51) Int. Cl.
*G02F 1/13357* (2006.01)
*G09G 3/34* (2006.01)
*G09G 3/36* (2006.01)

(52) U.S. Cl.
CPC ......... *G02F 1/1336* (2013.01); *G09G 3/3406* (2013.01); *G09G 3/3607* (2013.01); *G09G 3/3611* (2013.01); *G02F 2001/133614* (2013.01); *G02F 2203/30* (2013.01); *G09G 2320/064* (2013.01); *G09G 2320/0646* (2013.01); *G09G 2320/0666* (2013.01)

(58) Field of Classification Search
CPC ....... G02F 1/1336; G02F 2001/133614; G02F 2203/30; G09G 3/3406; G09G 3/3607; G09G 3/3611; G09G 2320/064; G09G 2320/0646; G09G 2320/0666
See application file for complete search history.

(56) References Cited

U.S. PATENT DOCUMENTS

2009/0160754 A1 6/2009 Nagai
2013/0293596 A1* 11/2013 Atkins ................. G09G 3/3426
345/690
2016/0078801 A1* 3/2016 Hsieh .................. G09G 3/3413
345/82

FOREIGN PATENT DOCUMENTS

JP 2009-156956 A 7/2009

* cited by examiner

*Primary Examiner* — Wing H Chow
(74) *Attorney, Agent, or Firm* — ScienBiziP, P.C.

(57) ABSTRACT

A display device includes a display panel in which display pixels including colored pixels of a plurality of colors are arranged, an illumination device including a light source and configured to illuminate the display panel with light, and a control substrate configured to control drive of the display pixels, wherein the control substrate includes a display data generation circuit configured to generate display data for driving the display pixels, based on image data supplied from an external image signal supply source, a detection circuit configured to detect a change in luminance light modulation data for modulating luminance of the light source, supplied from an external image signal supply source, and a display data correction circuit configured to correct the display data, based on an output value of the detection circuit.

11 Claims, 12 Drawing Sheets

DISPLAY DEVICE COMPRISING A CONTROL SUBSTRATE CONFIGURED TO CONTROL DRIVE OF DISPLAY PIXELS

TECHNICAL FIELD

The disclosure relates to a display device.

BACKGROUND ART

In the prior art, a white LED, which is a light source of a liquid crystal display device, has a blue LED element, and a red phosphor and a green phosphor emitting light by excitation light (blue light) of the blue LED element. As a result, light emission of the white LED includes blue light, red light emitted from the red phosphor, and green light emitted from the green phosphor, and generally exhibits white color. For this reason, for example, if the response speed of the red phosphor with respect to the excitation light of the blue LED element is slow, the red color remains emitting after the blue LED element is turned off, and the display screen remains a red residue or becomes reddish. Indeed, it is known that KSF phosphors (one example of bifluoride red phosphors) known as one of red phosphors are likely to cause such a change in color level because the response speed with respect to emission light of a blue LED element is slow while achieving excellent color reproducibility and luminance of red light.

A liquid crystal display device described in PTL1 is disclosed as a means for correcting a change in color level caused by a response speed of a phosphor. The liquid crystal display device described in PTL1 can correct color level when transmitting through a liquid crystal panel even in a case where light from a light source changes in color level, by controlling signals (gain control signals) for driving each pixel of three colors (R, G, B) of the liquid crystal panel in consideration of the response speed of the phosphor in accordance with a change in the amount of light emitted by the light source (luminance of a backlight device).

CITATION LIST

Patent Literature

PTL1: JP 2009-156956 A

SUMMARY

Technical Problem

However, in PTL1, the backlight device is configured assuming color level correction for a steady color at each luminance in a case where a user changes luminance from 100% to 50%, for example, and practically cannot appropriately correct a change in color level caused at a moment that luminance changes (caused in about tens of ms after change in luminance). Such a change in color level appears significantly as the amount of change in luminance increases such as from 100% to 10%.

The disclosure has been completed based on the circumstances described above, and an object of the disclosure is to suppress change in color level caused by change in luminance based on an image signal.

Solution to Problem (1) An embodiment of the disclosure is a display device including: a display panel in which display pixels including colored pixels of a plurality of colors are arranged; an illumination device including a light source and configured to illuminate the display panel with light; and a control substrate configured to control drive of the display pixels, wherein the control substrate includes: a display data generation circuit configured to generate display data for driving the display pixels, based on image data supplied from an external image signal supply source; a detection circuit configured to detect a change in luminance light modulation data for modulating luminance of the light source, supplied from an external image signal supply source; and a display data correction circuit configured to correct the display data, based on an output value of the detection circuit.

(2) An embodiment of the disclosure is a display device in which, in addition to the configuration of (1) described above, the light source includes a light-emitting element configured to emit a first color, a second color phosphor configured to emit a second color different from the first color by responding to excitation light of the light-emitting element, and a third color phosphor configured to emit a third color different from the first color and the second color by responding to excitation light of the light-emitting element, and the display data correction circuit corrects the display data, based on a response speed of at least one of the second color phosphor or the third color phosphor with respect to the excitation light.

(3) An embodiment of the disclosure is a display device in which, in addition to the configuration of (2) described above, the display data correction circuit corrects the display data for driving the colored pixels being a same color as a luminescent color of one of the second color phosphor or the third color phosphor whose response speed is slow.

(4) An embodiment of the disclosure is a display device in which, in addition to the configuration of (2) described above, the display data correction circuit corrects the display data for driving each of the colored pixels being a same color as the first color and the colored pixels being a same color as a luminescent color of one of the second color phosphor or the third color phosphor whose response speed is fast.

(5) An embodiment of the disclosure is a display device in which, in addition to the configuration of any one of (2) to (4) described above, the first color is a blue color, the second color is a red color, and the third color is a green color, and the second color phosphor is a red phosphor constituted of a KSF phosphor.

(6) An embodiment of the disclosure is a display device in which, in addition to the configuration of any one of (1) to (5) described above, the light source is driven by PWM light modulation, and the luminance light modulation data is a duty ratio of a PWM signal for driving the light source by PWM light modulation.

(7) An embodiment of the disclosure is a display device in which, in addition to the configuration of (6) described above, the detection circuit detects a change in the luminance light modulation data by measuring an amount of change of the duty ratio in a unit time.

(8) An embodiment of the disclosure is a display device in which, in addition to the configuration of any one of (1) to (7) described above, the display data generation circuit generates display data to be input into the display pixels as a gray scale value, based on color information included in the image data.

(9) An embodiment of the disclosure is a display device in which, in addition to the configuration of (5) described above, the light source is driven by PWM light modulation, the luminance light modulation data is a duty ratio of a PWM signal for driving the light source by PWM light modulation, the display data generation circuit generates display data to be input into the display pixels as gray scale values, based on color information included in the image data, and the display data correction circuit corrects to decrease the gray scale value of the colored pixel of the red color in a case where the duty ratio decreases, and corrects to decrease the gray scale value of the colored pixel of the green color and the gray scale value of the colored pixel of the blue color in a case where the duty ratio increases.

(10) An embodiment of the disclosure is a display device in which, in addition to the configuration of any one of (1) to (9) described above, the control substrate includes a luminance light modulation data correction circuit configured to correct the luminance light modulation data, based on an output value of the detection circuit and an output value of the display data correction circuit, and the luminance light modulation data correction circuit outputs the luminance light modulation data corrected, to a light source drive unit configured to drive the light source.

(11) An embodiment of the disclosure is a display device in which, in addition to the configuration of any one of (1) to (10) described above, the display panel is a liquid crystal panel.

Advantageous Effects of Disclosure

According to the disclosure, a change in color level caused by a change in luminance based on an image signal can be suppressed.

DESCRIPTION OF EMBODIMENTS

First Embodiment

A configuration according to the first embodiment will be described with reference to FIGS. 1 to 6. In the present embodiment, a liquid crystal display device 10 (an example of a display device) is illustrated. The X axis, the Y axis, and the Z axis are illustrated in a part of each drawing, and each axial direction is illustrated to be a common direction in each drawing. A liquid crystal panel 20 side in the Z axis direction is a front side, and a backlight device 30 side is a back side.

Figure 1:
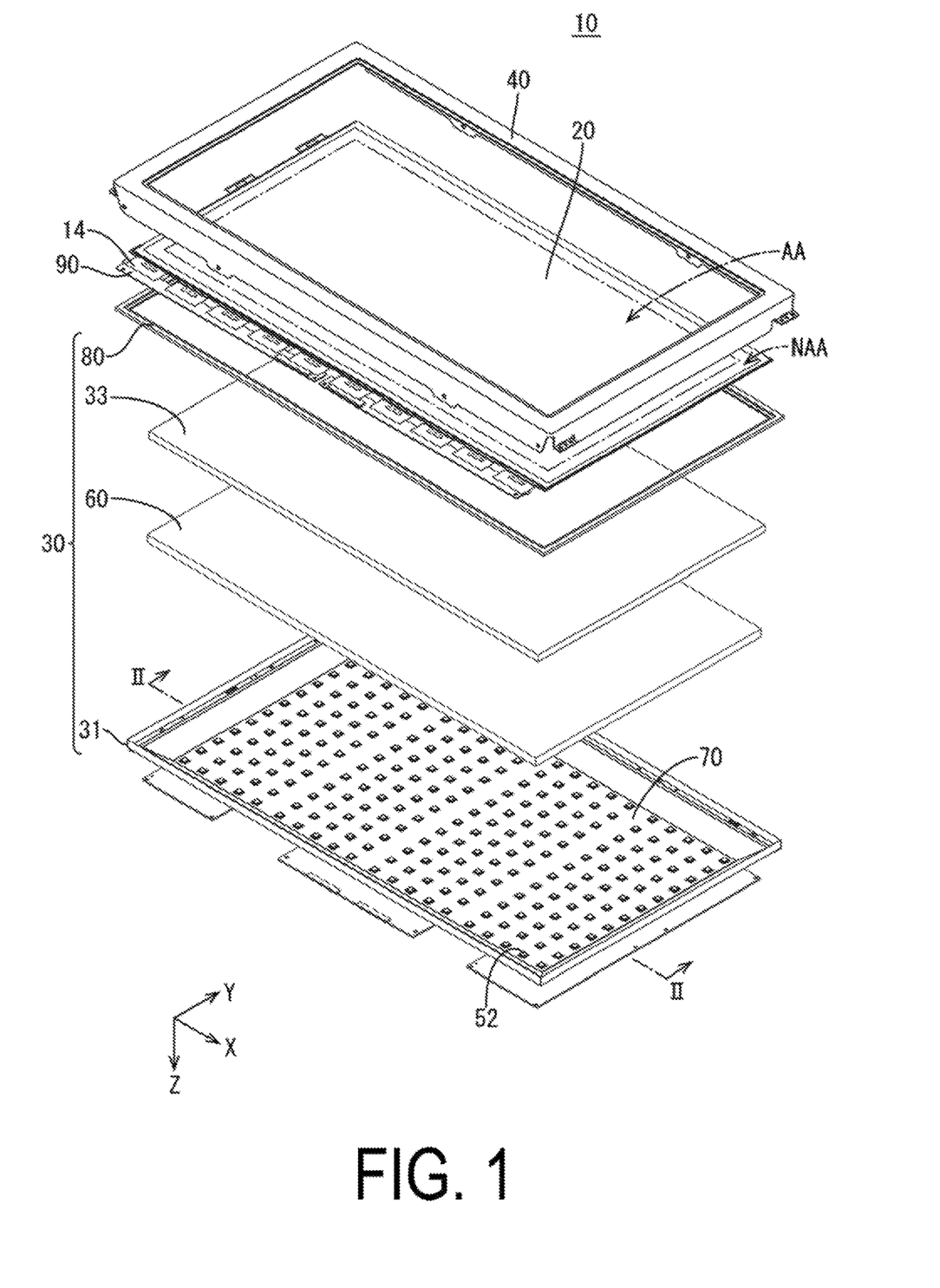
FIG. 1 is an exploded perspective view of a liquid crystal display device according to a first embodiment of the disclosure.
Figure 2:
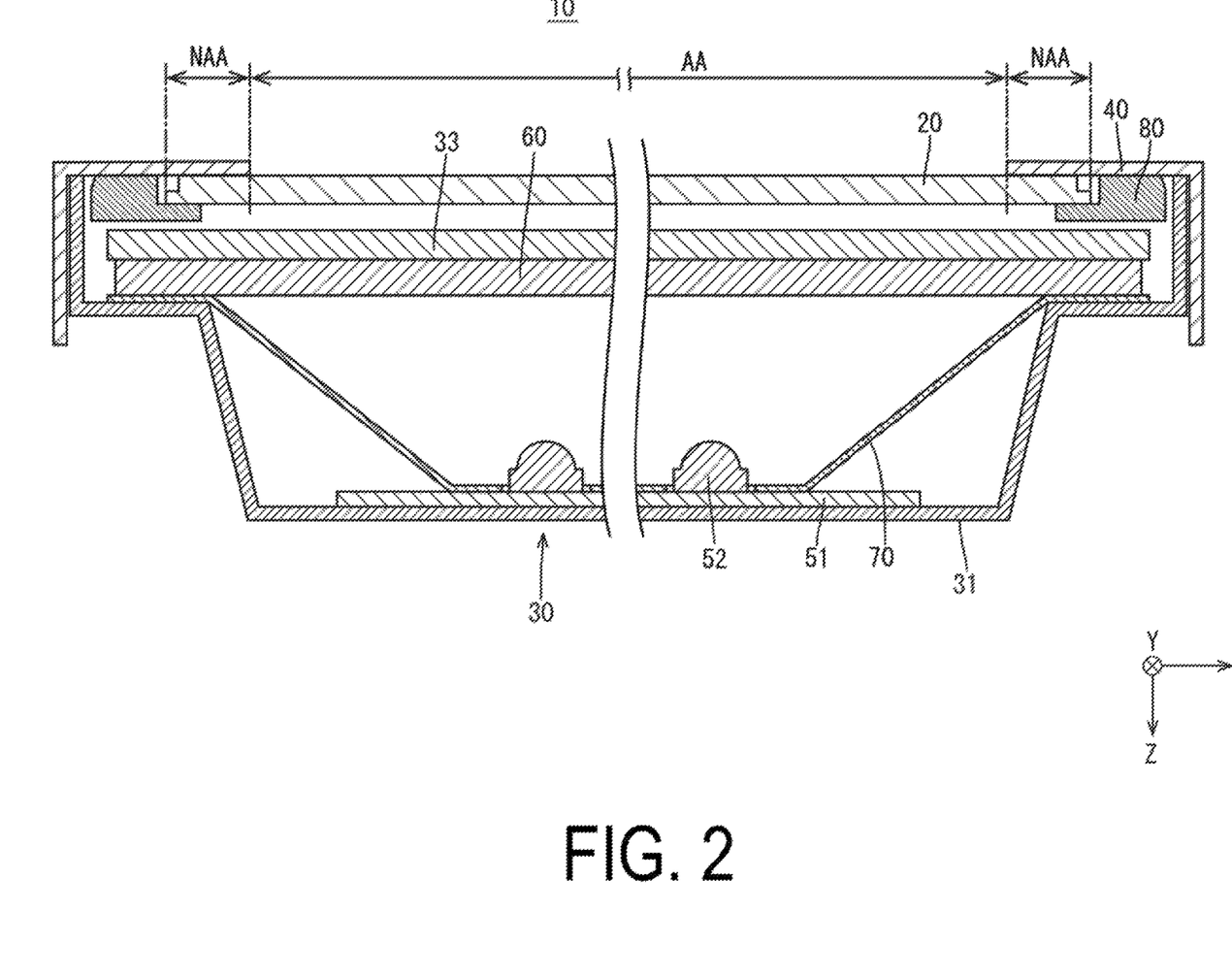
FIG. 2 is a cross-sectional view taken along a II-II line in FIG. 1.

As illustrated in FIG. 1 and FIG. 2, the liquid crystal display device 10 according to the present embodiment includes a liquid crystal panel 20 (one example of a display panel) that displays an image, and a backlight device 30 (one example of an illumination device) disposed on the back side of the liquid crystal panel 20 for illuminating light, and is integrally supported by a bezel 40 and a frame 80, and the like, which are support members forming a frame shape. The liquid crystal panel 20 is connected with a control substrate 90 such as a system LSI (Timing Controller (TCON)) for supplying image data and various control signals that are necessary for image display through a flexible substrate 14 which is a wiring line substrate with flexibility. The control substrate 90 outputs signals to a gate drive circuit 25, a source drive circuit 26, and the like described below.

As illustrated in FIGS. 1 and 2, the backlight device 30 includes a generally box-shaped chassis 31 (housing member) that opens toward the front side, and includes a diffuser plate 60 disposed to cover the opening of the chassis 31, and an optical sheet 33 that imparts a predetermined optical effect to light emitted from the diffuser plate 60. Within the chassis 31 is housed LEDs 52 (one example of a light source) disposed to face the back side of the diffuser plate 60, a LED substrate 51 on which the LEDs 52 are mounted, and a reflection sheet 70 that reflects light in the chassis 31 toward the diffuser plate 60 side. The backlight device 30 forms a so-called direct type backlight device in which the LEDs 52 are arranged in a surface form on the back side of the liquid crystal panel 20.

The LED substrate 51 is housed extending along the bottom of the chassis 31, as shown in FIG. 2. In the plate surface of the LED substrate 51, a plurality of the LEDs 52 are arranged in parallel in a matrix at approximately equal intervals in the X axis direction (row direction) and the Y axis direction (column direction) on the plate surface (mounting surface) facing toward the front side. The LEDs 52 are electrically connected to one another in a wiring line pattern of being disposed in the plane of the mounting surface.

Figure 3:
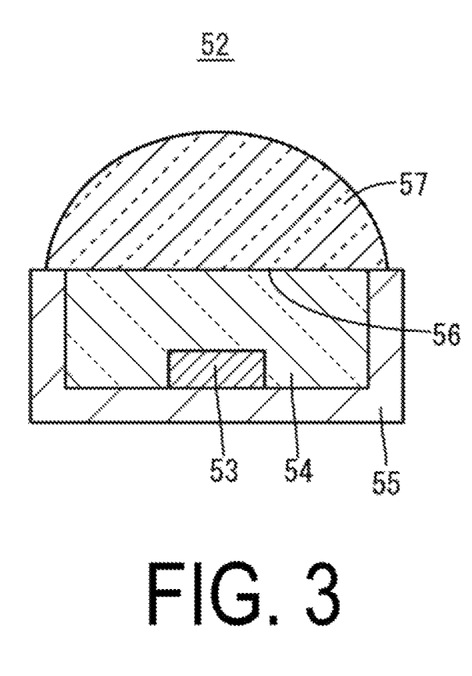
FIG. 3 is a cross-sectional view of a LED.

As illustrated in FIG. 3, the LED 52 is a so-called top emission type (top view type) having a light-emitting face 56 facing opposite the LED substrate 51 side. As illustrated in FIG. 3, the LED 52 includes a blue (one example of a first color) LED element 53 (LED chip) (one example of a light-emitting element) as a light emission source, a sealing material 54 sealing the blue LED element 53, and a case 55 in which the blue LED element 53 is housed and the sealing material 54 is filled. The LED 52 includes a lens 57 having a substantially cross section semicircular shape covering over the light-emitting face 56, and a diffusion effect or the like is imparted to light emitted from the light-emitting face 56 by the lens 57.

The blue LED element 53 is a semiconductor made of a semiconductor material such as InGaN, for example, and emits blue light having a wavelength included in a blue wavelength region (approximately 420 nm to approximately 500 nm) by applying a voltage in the forward direction. Specifically, the main emission wavelength of the blue LED element 53 is preferably approximately 450 nm, but this is not necessarily the case. The sealing material 54 is formed by dispersing a red (an example of a second color) phosphor and a green (an example of a third color) phosphor in a substantially transparent thermosetting resin material (for example, an epoxy resin material or the like) at a predetermined ratio. The red phosphor emits red light at a wavelength included in a red wavelength region (approximately 600 nm to approximately 780 nm) by being excited by blue light emitted from the blue LED element 53. The green phosphor emits green light at a wavelength included in a green wavelength region (approximately 500 nm to approximately 570 nm) by being excited by blue light emitted from the blue LED element 53. Therefore, emission light of the LED 52 includes blue light emitted from the blue LED element 53 (light of the blue component), red light emitted from the red phosphor (light of the red component), and green light emitted from the green phosphor (light of the green component), and as a whole exhibits a generally white color.

Specifically, a KSF phosphor ($K_2SiF_6$), which is a type of bifluoride red phosphor with a main emission wavelength of approximately 630 nm, is used as the red phosphor. The KSF phosphor has characteristics of both high color reproducibility and high luminance for emitted red light, while the response speed for excitation light (blue light) from the blue LED element is slow. Thus, the KSF phosphor may continue to emit red light for a predetermined period of time after the supply of blue light is interrupted, or may not emit light immediately after starting the supply of blue light. A sialon phosphor (β-SiAlON), which is a type of oxynitride phosphor, for example, with a main emission wavelength of approximately 540 nm, can be used as the green phosphor.

The β-SiAlON has both high color reproducibility and high luminance for emitted green light, and the response speed for blue light is also fast.

Figure 4:
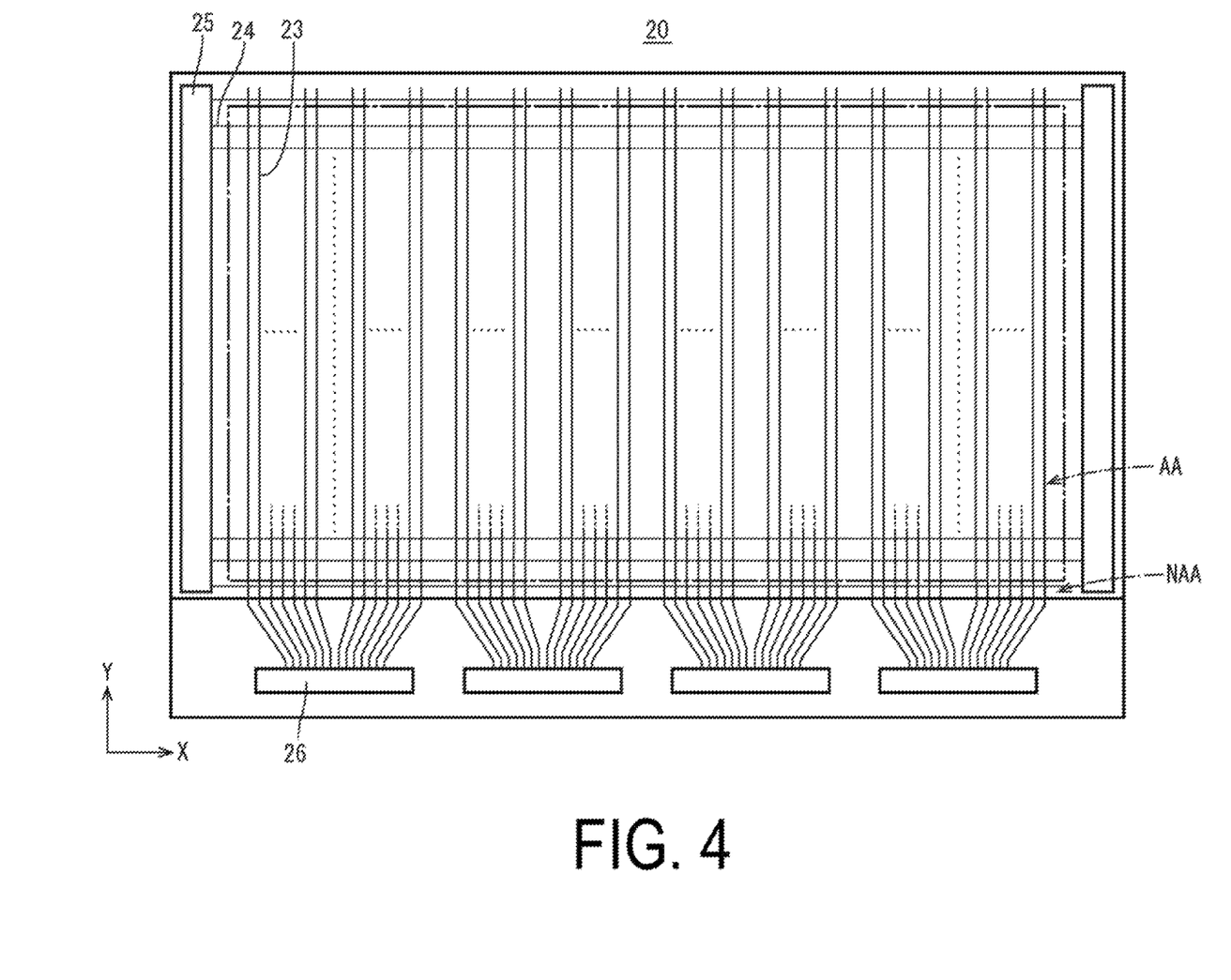
FIG. 4 is a plan view illustrating an arrangement aspect of wiring line in a liquid crystal panel.

As illustrated in FIG. 4, the liquid crystal panel 20 has an overall lateral box shape (rectangular shape), and inside the plane is divided into a display region (active area) AA capable of displaying an image and disposed on the center side, and a non-display region (non-active area) NAA that forms a frame shape surrounding the display region AA in a plane view. In FIG. 4, the dot-dash line represents the outline of the display region AA, and a region outside the dot-dash line is the non-display region NAA. The liquid crystal panel 20 has a configuration in which a pair of transparent substrates are bonded at a predetermined gap, and a liquid crystal layer is sealed between both substrates. As illustrated in FIG. 4, a plurality of intersecting source wiring lines (data lines and signal lines) 23 and gate wiring lines (scanning lines) 24 are formed in a lattice shape in the substrates of the liquid crystal panel 20.

Switching elements (e.g., TFT) are formed near the intersections between the source wiring lines 23 and the gate wiring lines 24, and pixel electrodes that connect with the switching elements are formed in the region surrounding the source wiring lines 23 and the gate wiring lines 24. The source wiring lines 23 are connected to a source drive circuit 26 provided on the long side of the non-display region NAA, and the gate wiring lines 24 are connected to a gate drive circuit 25 provided on the short side of the non-display region NAA. Signals transmitted from the gate drive circuit 25 and the source drive circuit 26 are input to the switching elements through the source wiring lines 23 and the gate wiring lines 24 to change the potential of the pixel electrodes connected to the switching elements. Then, the electric field applied to the liquid crystal layer is controlled by the potential of the pixel electrodes, and the alignment state of the liquid crystal molecules is appropriately switched to change the transmittance of light transmitted through the liquid crystal panel 20.

Figure 5:
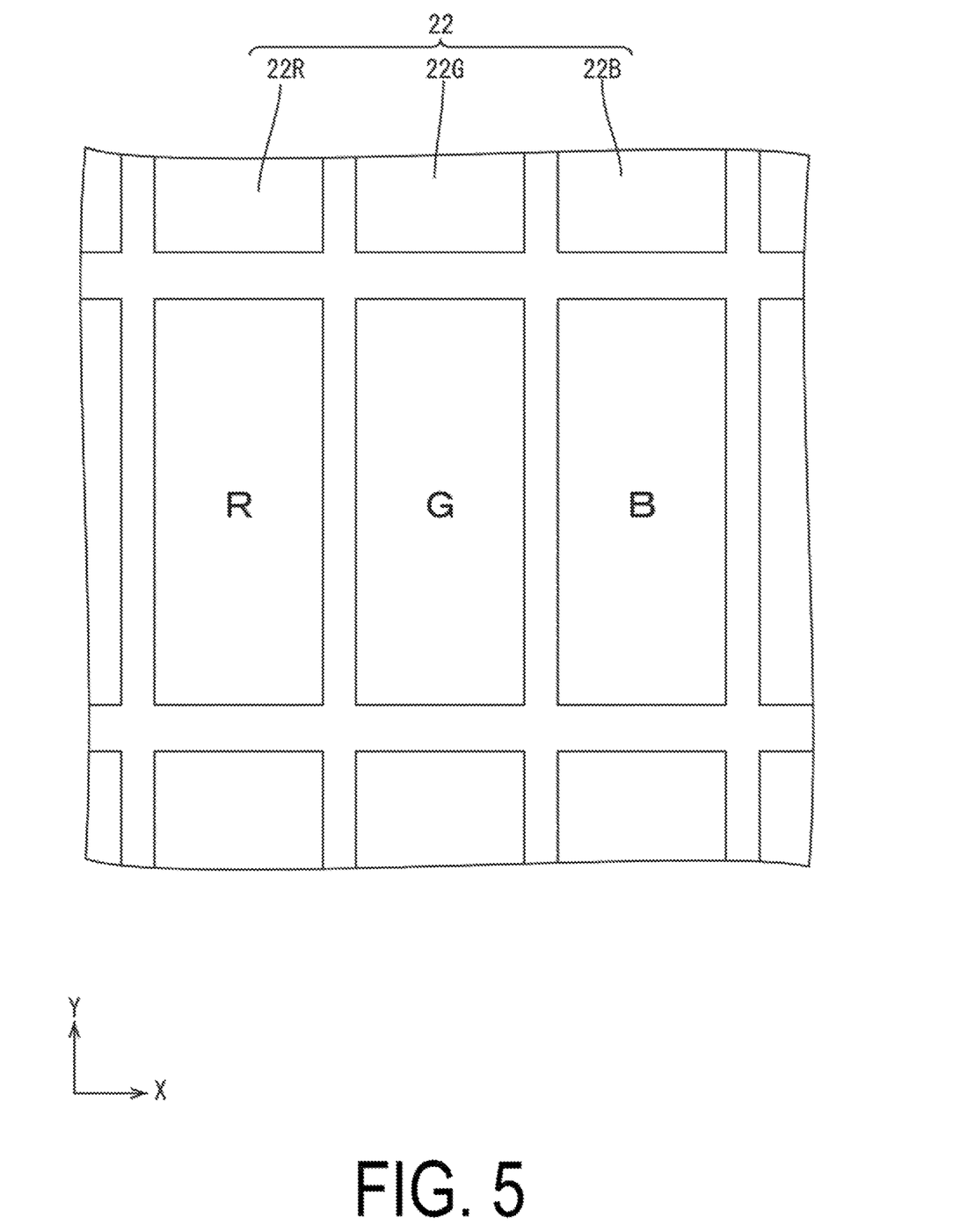
FIG. 5 is an enlarged view of display pixels of the liquid crystal panel.

As illustrated in FIG. 5, color filters constituted by each colored portion of R (red), G (green), and B (blue) are formed in opposition to the pixel electrodes in the regions surrounded by the source wiring lines 23 and the gate wiring lines 24. In the liquid crystal panel 20, one display pixel 22 is constituted by a set of three color colored portions of R, G, B and three pixel electrodes opposing them. In other words, the display pixel 22 includes three colored pixels (subpixels) of a red pixel 22R having a colored portion of R, a green pixel 22G having a colored portion of G, and a blue pixel 22B having a colored portion of B. The potentials of the pixel electrodes are individually controlled for each colored pixel 22R, 22G, 22B, and thus light having changes in the transmittance for each colored pixel 22R, 22G, 22B passes through the color filters. In this manner, the light from the backlight device 30 transmits through the liquid crystal panel 20 having a transmittance configured for each colored pixel 22R, 22G, 22B and exits the display surface 20A, to achieve color display with the display pixels 22 as display units in the liquid crystal display device 10.

Figure 6:
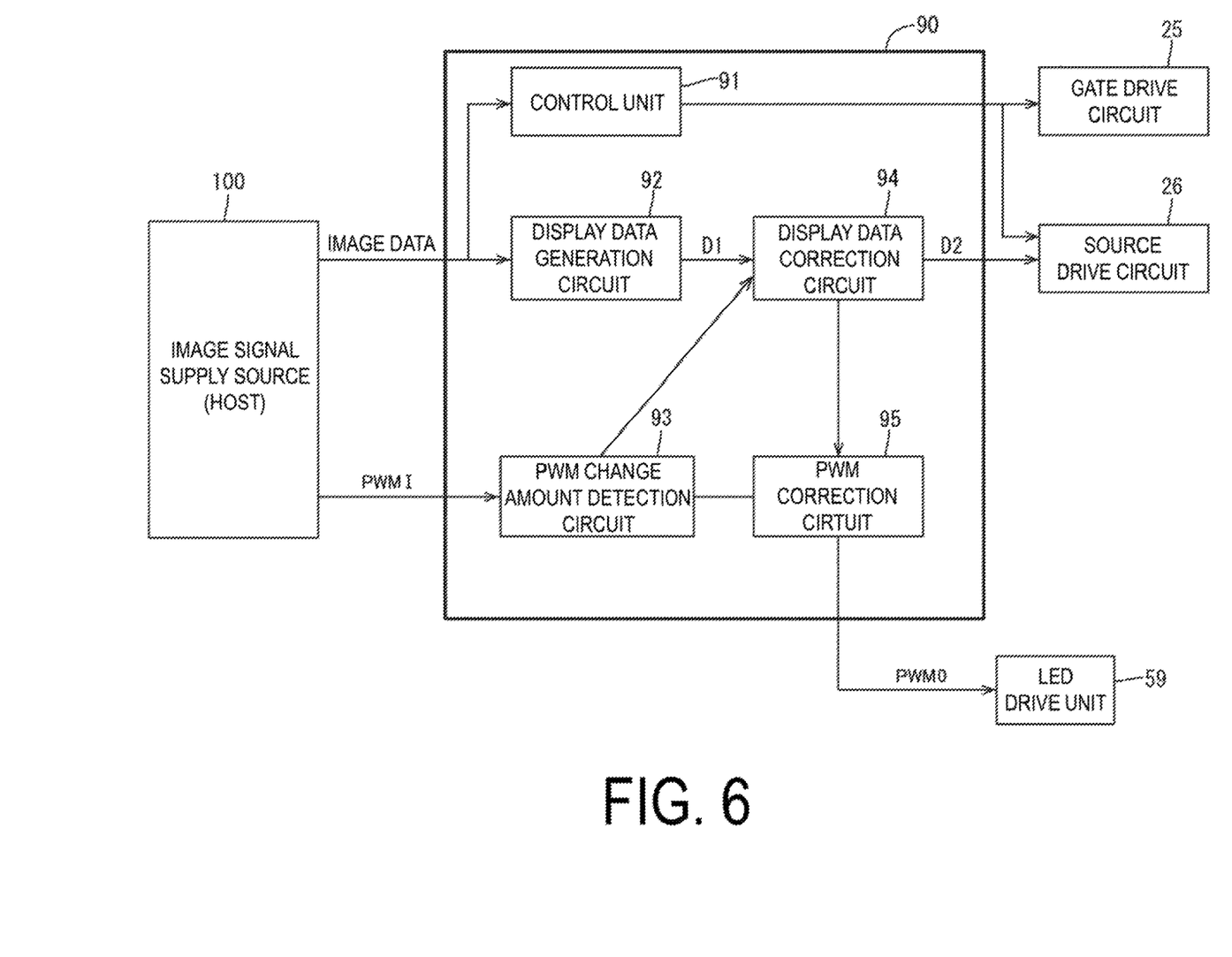
FIG. 6 is a block diagram related to control of a LED and a liquid crystal panel.

Next, drive control of the liquid crystal display device 10 will be described. As illustrated in FIG. 6, luminance light modulation data PWMI for modulating the luminance of the image data (content) and the LEDs 52 is supplied from an external image signal supply source (host) 100 such as a computer to the control substrate 90 of the liquid crystal display device 10. The image data is input to a control unit 91 and a display data generation circuit 92 in the control substrate 90. The control unit 91 outputs a signal for causing the switching elements to be ON to the gate drive circuit 25 and the source drive circuit 26. The display data generation circuit 92 generates 256 gray scale signals that take gray scale values of 0 to 255 (an example of display data), based on color information included in the image data, for each of the colored pixels 22R, 22G, 22B. By controlling each of the colored pixels 22R, 22G, 22B within the range of 256 gray scale, the display color of the display pixels 22 can be approximately 16,770 thousand colors.

In the backlight device 30, the LEDs 52 are periodically flashing by inputting a pulsed voltage signal (pulse signal), and the amount of emission of the LEDs 52 is controlled by changing the time ratio (duty ratio) between the lighted period and the extinguished period. In other words, the LEDs 52 are driven by Pulse Width Modulation (PWM) light modulation. The duty ratio (one example of the luminance light modulation data PWMI) of the PWM signal for driving by PWM light modulation is generated at the host 100 and is supplied to a PWM change amount detection circuit 93 (one example of the detection circuit) in the control substrate 90. The PWM change amount detection circuit 93 measures an amount of change (PWM change amount) in a unit time in the luminance light modulation data PWMI (duty ratio), and outputs an output value based on the result to a display data correction circuit 94. The display data correction circuit 94 corrects a gray scale value D1 output from the display data generation circuit 92, based on the output value, and generates a corrected gray scale value D2. The corrected gray scale value D2 is output to the source drive circuit 26.

The output value of the PWM change amount detection circuit 93 is also input to a PWM correction circuit 95 (one example of the luminance light modulation data correction circuit) that corrects the luminance light modulation data PWMI. The PWM correction circuit 95 generates corrected luminance light modulation data PWMO, based on the output value of the PWM change amount detection circuit 93 and the output value of the display data correction circuit 94. The corrected luminance light modulation data PWMO is output to a LED drive unit 59 (one example of a light source drive unit) that drives the LEDs 52, and the LEDs 52 emit light at the duty ratio based on the corrected luminance light modulation data PWMO.

By correcting the luminance light modulation data PWMI (the duty ratio) by the PWM correction circuit 95 in this way, the reproducibility of color can be improved. For example, in a case where the color information of the image data is a black color, the output value of the display data correction circuit 94 corresponds to a black color, but the PWM correction circuit 95 generates the corrected luminance light modulation data PWMO to decrease the duty ratio, making the black color appear darker.

Drive Control Example 1 (Example 1)

Figure 7:
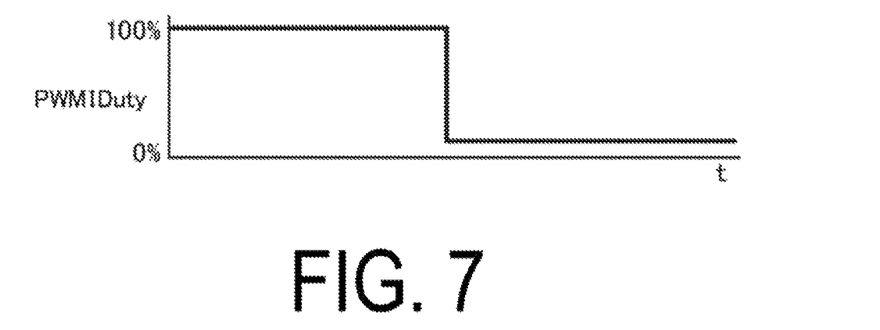
FIG. 7 is a graph showing a change in time in a duty ratio of luminance light modulation data.
Figure 8A:
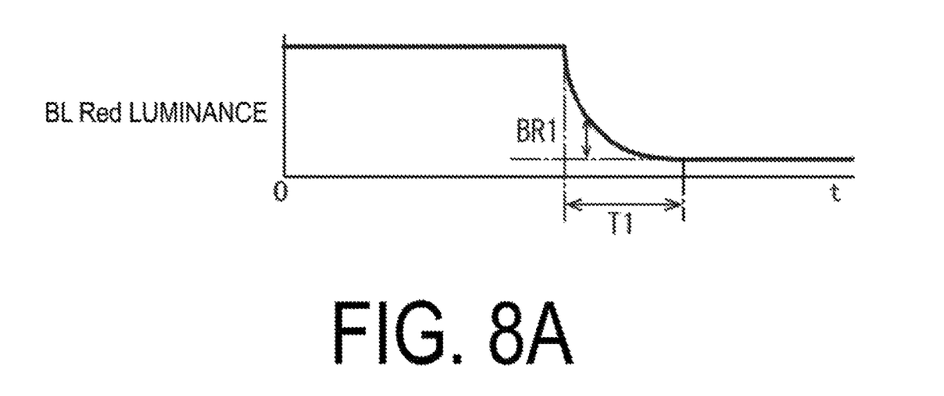
FIG. 8A is a graph showing a change in time in luminance of red light included in emission light of a backlight device.
Figure 8B:
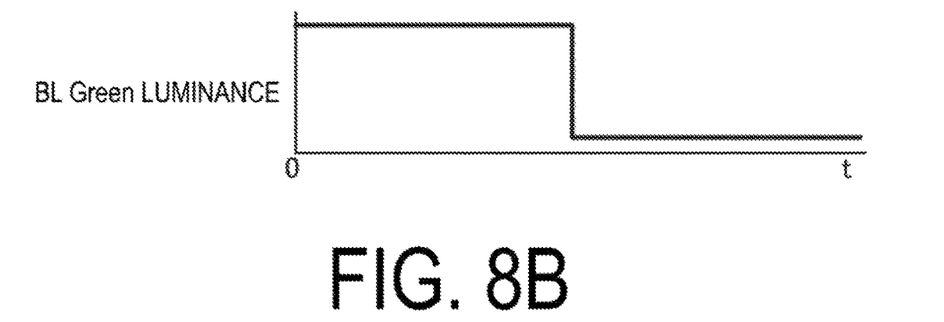
FIG. 8B is a graph showing a change in time in luminance of green light included in emission light of a backlight device.
Figure 8C:
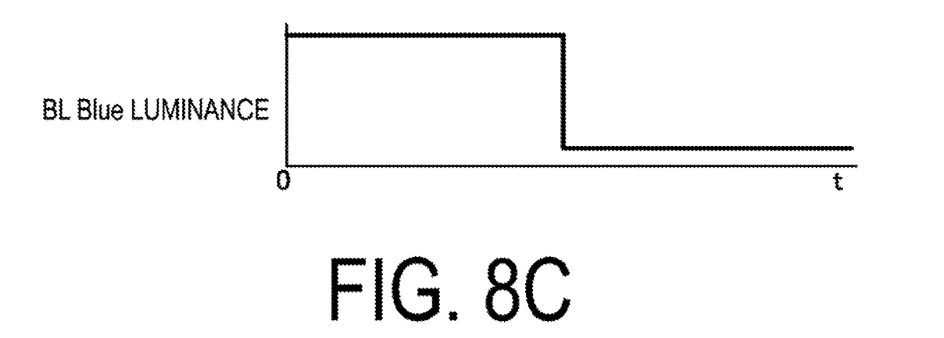
FIG. 8C is a graph showing a change in time in luminance of blue light included in emission light of a backlight device.

Next, a drive control example 1 of the liquid crystal display device 10 having the above-described configuration will be described with reference to FIGS. 7 to 11C. In a case where the luminance light modulation data PWMI (the duty ratio) is reduced from 100% to 10% as shown in FIG. 7, the blue light emitted from the blue LED elements 53 of the LEDs 52 suddenly decreases the luminance (darkens) following the change in the duty ratio as shown in FIG. 8C. The green light emitted from the green phosphor (sialon phosphor) excited by the blue light is rapidly reduced in the luminance following the change in the blue light as illustrated in FIG. 8B because the response speed with respect to the blue light is fast. In contrast, since the red phosphor (KSF phosphor) has a slow response speed with respect to the blue light as described above, the red phosphor cannot instantly follow the change in the blue light as illustrated in FIG. 8A, and the luminance of the red color reaches a steady state of the luminance corresponding to the duty ratio of 10% through a transient state (transition phase T1) in which the luminance of the red color gradually decreases. In the transition phase T1, the red light continues to emit even after the emission of the blue light and the green light is interrupted, so the luminance of the red light is greater than the blue light and the green light, and the emission light of the LEDs 52 becomes reddish.

Figure 9A:
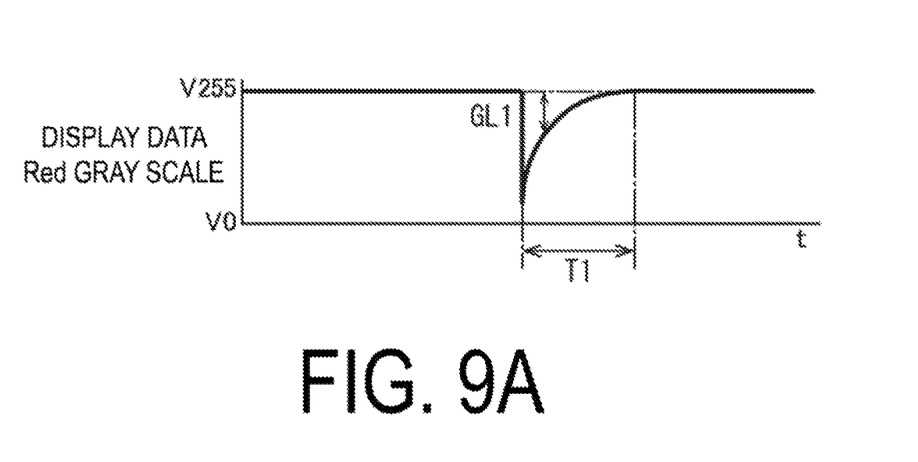
FIG. 9A is a graph showing a change in time in a gray scale value of a red pixel.
Figure 9B:
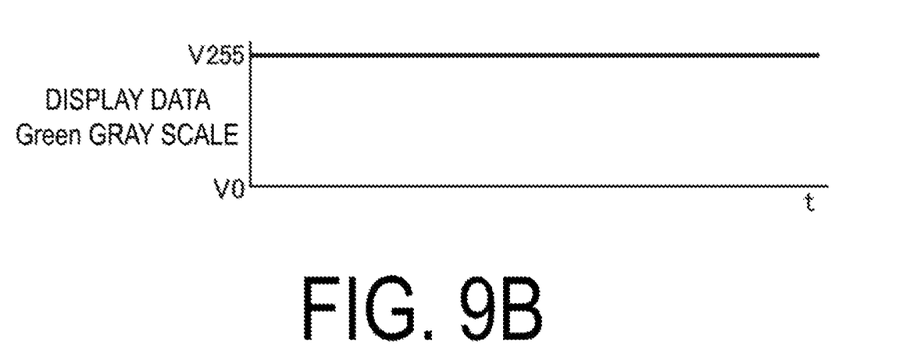
FIG. 9B is a graph showing a change in time in a gray scale value of a green pixel.
Figure 9C:
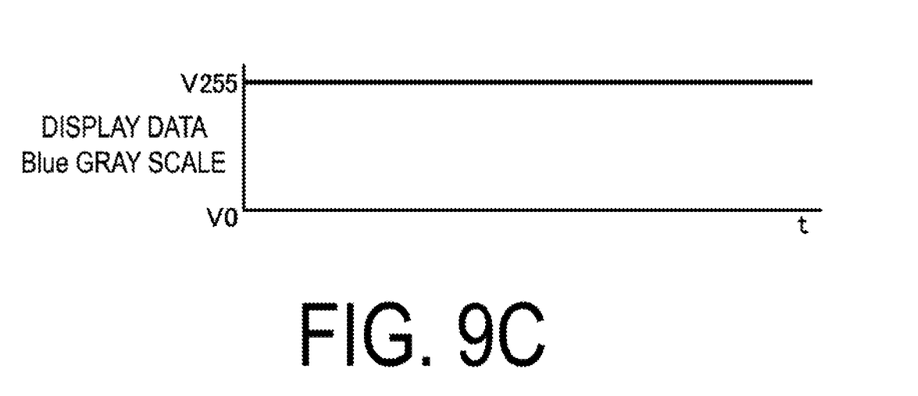
FIG. 9C is a graph showing a change in time in a gray scale value of a blue pixel.

In a case where the color information of the image data is a white color, the display data generation circuit 92 generates the display data D1 in which the gray scale values of each of the red pixels 22R, the green pixels 22G, and the blue pixels 22B are "255", as illustrated in FIGS. 9A to 9C, for example. In a case where an amount of change in the duty ratio in the luminance light modulation data PWMI is not detected in the PWM change amount detection circuit 93, the display data correction circuit 94 outputs the display data D1 (gray scale value 255) as the display data D2 (gray scale value 255). In a case where an amount of change in the duty ratio in the luminance light modulation data PWMI is detected in the PWM change amount detection circuit 93, the display data correction circuit 94 outputs the display data D1 (gray scale value 255) corrected to suppress the change in color level of the emission light of the LEDs 52 as the display data D2.

As illustrated in FIG. 9A, the display data correction circuit 94 performs correction to reduce the gray scale value of the colored pixels (red pixels 22R) of the same color (including substantially the same color) as the red color in the transition phase T1, and generates a reduced gray scale value as the display data D2. More specifically, the display data correction circuit 94 determines a correction amount GL1 (of the gray scale value) of the red pixels 22R in accordance with an emission amount BR1 of the red light in the transition phase T1, and corrects the uncorrected display data D1 (gray scale value 255) by the correction amount GL1 to generate the display data D2. In FIG. 9A, the display data D2 is the display data D1 of the red pixels 22R decreased by the correction amount GL1.

Figure 10A:
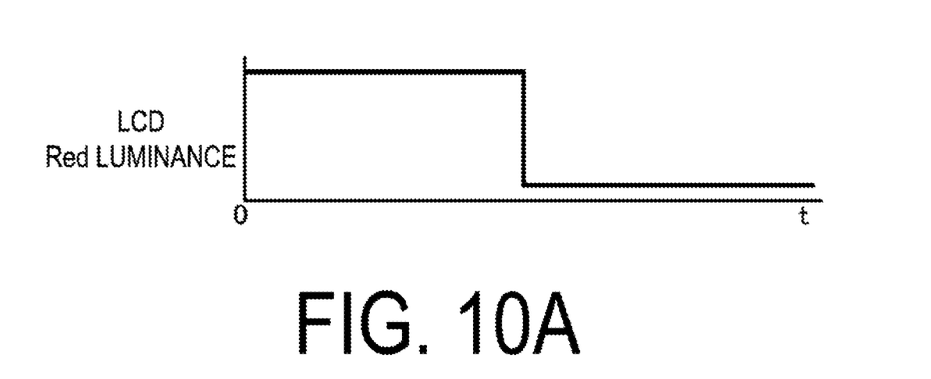
FIG. 10A is a graph showing a change in time in luminance of red light included in emission light of a liquid crystal display device.
Figure 10B:
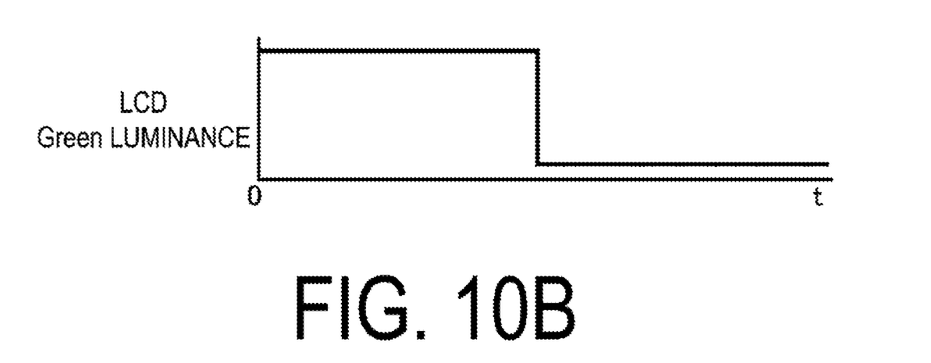
FIG. 10B is a graph showing a change in time in luminance of green light included in emission light of a liquid crystal display device.
Figure 10C:
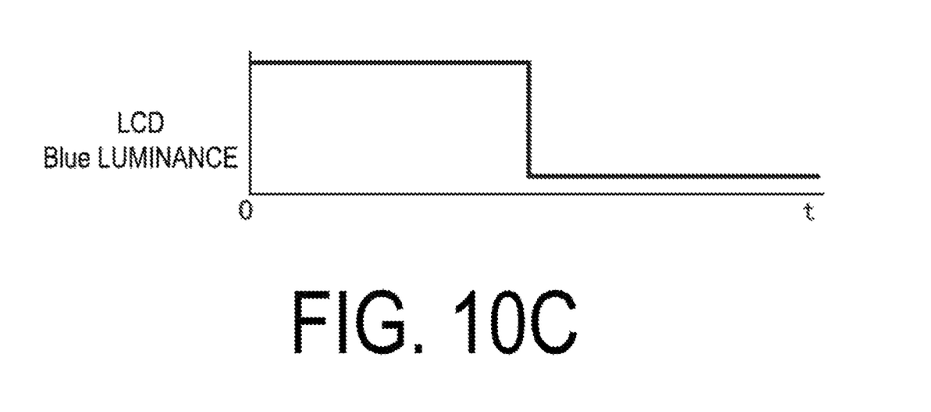
FIG. 10C is a graph showing a change in time in luminance of blue light included in emission light of a liquid crystal display device.

Lowering the gray scale value of the red pixels 22R in the transition phase T1 reduces the transmittance of the red light transmitted through the liquid crystal panel 20. As the result, as illustrated in FIG. 10A, the luminance of the red light emitted from the liquid crystal display device 10 (the display surface of the liquid crystal panel 20) is corrected to be the same as the luminance of the green light in FIG. 10B and the blue light in FIG. 10C, and the white balance is adjusted. As the result, the problem of reddish in the display screen is eliminated at the moment (the transition phase T1) when the duty ratio of the luminance light modulation data PWMI suddenly decreases, and the change in color level caused by the change in luminance of the light source based on the image signal can be suppressed.

Drive Control Example 2 (Example 2)

A drive control example 2 by the liquid crystal display device 10 will be described with reference to FIGS. 11 to 14C. The configuration of the liquid crystal display device 10 for the drive control example 2 is as illustrated in the first embodiment, and descriptions overlapping with the drive control example 1 will be omitted.

Figure 11:
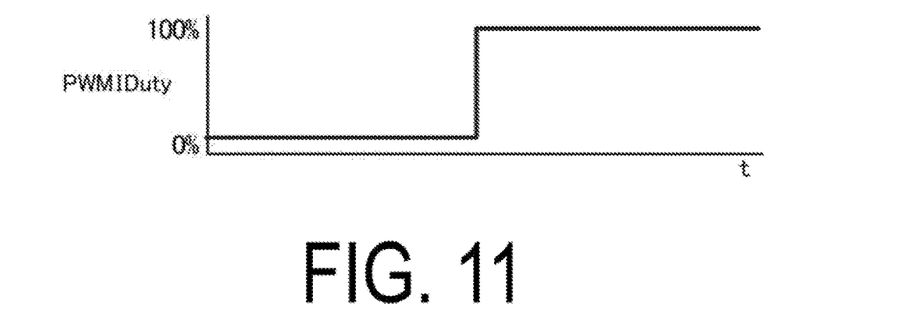
FIG. 11 is a graph showing a change in time in a duty ratio of luminance light modulation data.
Figure 12A:
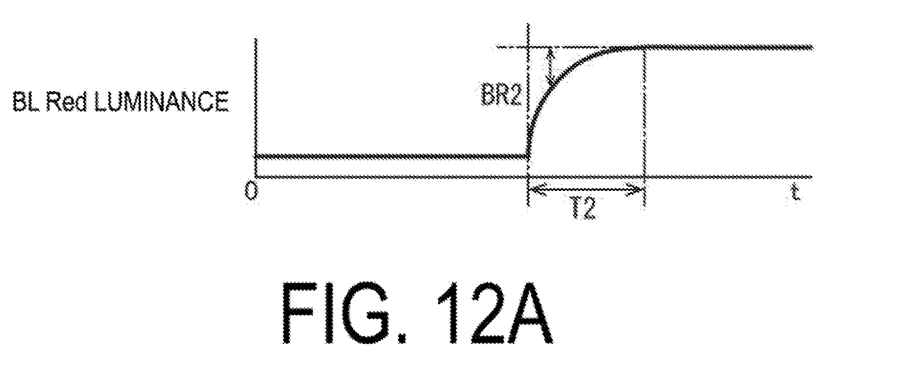
FIG. 12A is a graph showing a change in time in luminance of red light included in emission light of a backlight device.
Figure 12B:
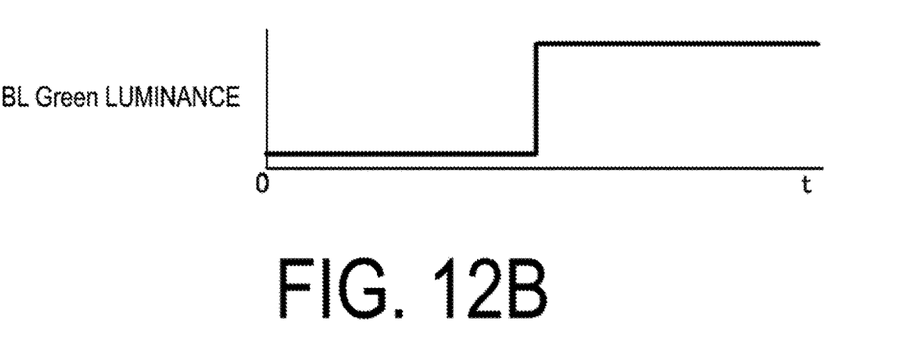
FIG. 12B is a graph showing a change in time in luminance of green light included in emission light of a backlight device.
Figure 12C:
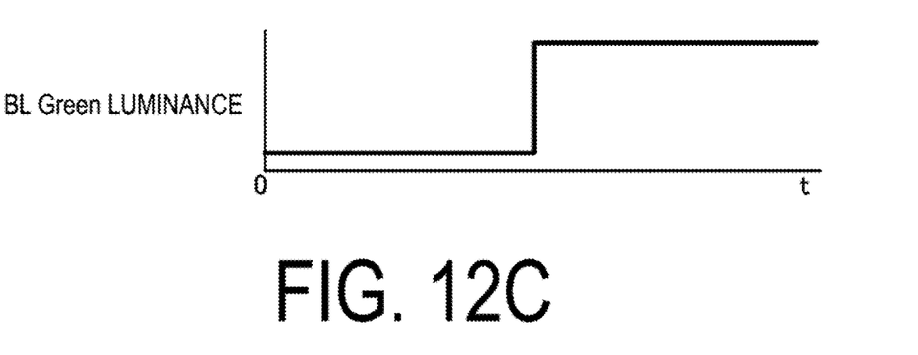
FIG. 12C is a graph showing a change in time in luminance of blue light included in emission light of a backlight device.

As shown in FIG. 11, in a case where the duty ratio of the luminance light modulation data PWMI increases from 10% to 100%, the blue light emitted from the blue LED elements 53 of the LEDs 52 increases the luminance (lightens) rapidly following the change in the duty ratio as shown in FIG. 12C. Since the green phosphor (sialon phosphor) has a fast response speed with respect to the blue light, the green light rapidly increases in the luminance following the change in the blue light (FIG. 12B). In contrast, since the red phosphor (KSF phosphor) has a slow response speed with respect to the blue light as described above, the red phosphor cannot instantly follow the change in the blue light as illustrated in FIG. 12A, and the luminance of the red color reaches a steady state of the luminance corresponding to the duty ratio of 100% through a transient state (transition phase T2) in which the luminance of the red color gradually increases. In the transition phase T2, the light emission amount of the red light is smaller than the light emission amounts of the blue light and the green light, so that the emission light of the LEDs 52 is colored closer to a mixed color of the blue light and the green light.

Figure 13A:
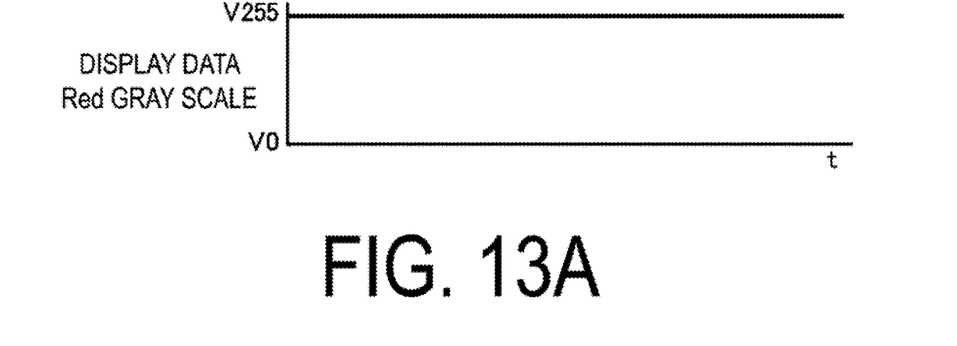
FIG. 13A is a graph showing a change in time in a gray scale value of a red pixel.

In a case where the color information of the image data is a white color, the display data generation circuit 92 generates the display data D1 in which the gray scale values of each of the red pixels 22R, the green pixels 22G, and the blue pixels 22B are "255", as illustrated in FIGS. 13A to 13C, for example. The luminance of the red light included in the emission light of the LEDs 52 is smaller than the green light and the blue light in the transition phase T2 (FIG. 12A to FIG. 12C), but the gray scale value of the colored pixels (red pixels 22R) of the same color (including substantially the same color) as the red color is the maximum value of 255 (FIG. 13A), so the gray scale value of the red pixels 22R cannot be corrected to increase. Thus, the display data correction circuit 94 performs correction to reduce the gray scale values of the colored pixels (the green pixels 22G and the blue pixels 22B) of the same color (including substantially the same color) as the green color and the blue color in the transition phase T2, and generates reduced gray scale values as the display data D2.

Figure 13B:
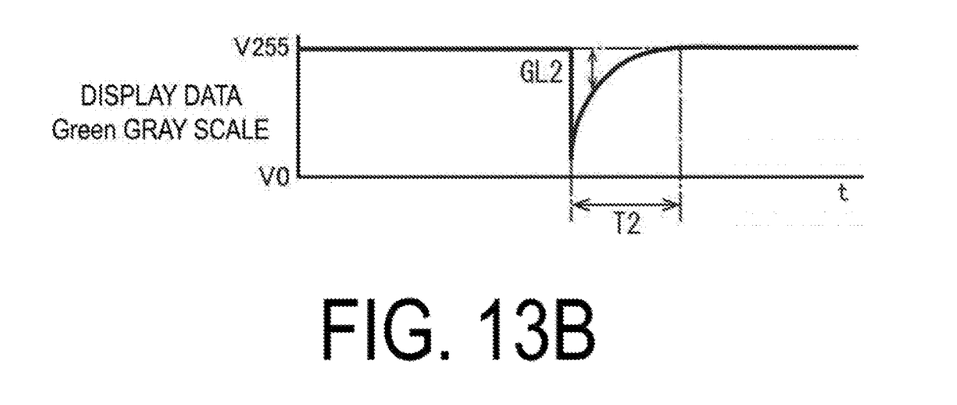
FIG. 13B is a graph showing a change in time in a gray scale value of a green pixel.
Figure 13C:
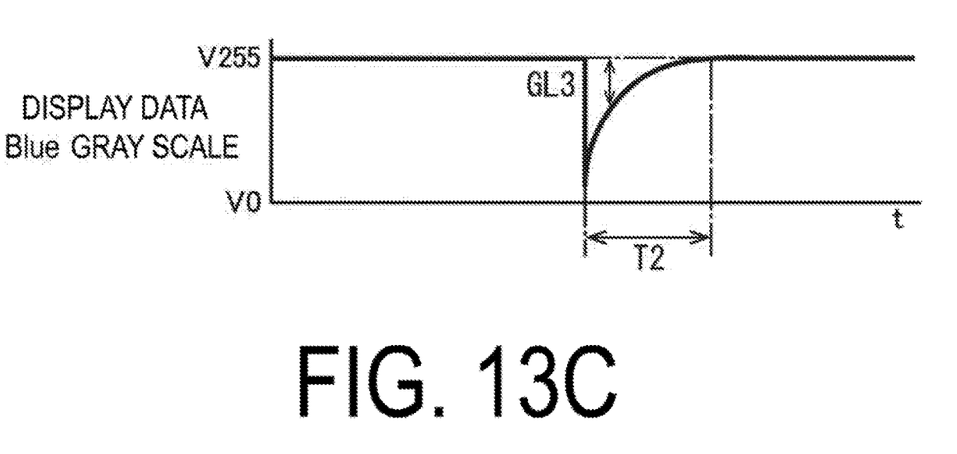
FIG. 13C is a graph showing a change in time in a gray scale value of a blue pixel.

The display data correction circuit 94 configures correction amounts GL2 and GL3 for the gray scale values of the green pixels 22G and the blue pixels 22B corresponding to an emission amount BR2 of the red light in the transition phase T2, and corrects the display data D1 of the green pixels 22G and the blue pixels 22B by the correction amounts GL2 and GL3, respectively, to generate the display data D2. In FIGS. 13B and 13C, the display data D2 of the green pixels 22G and the blue pixels 22B is the display data D1 (the gray scale value 255) reduced by the correction amounts GL2 and GL3.

Figure 14A:
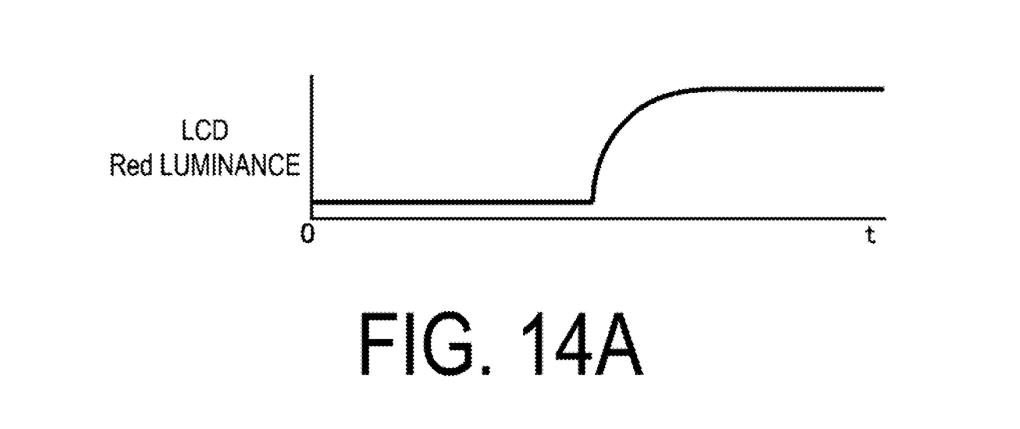
FIG. 14A is a graph showing a change in time in luminance of red light included in emission light of a liquid crystal display device.
Figure 14B:
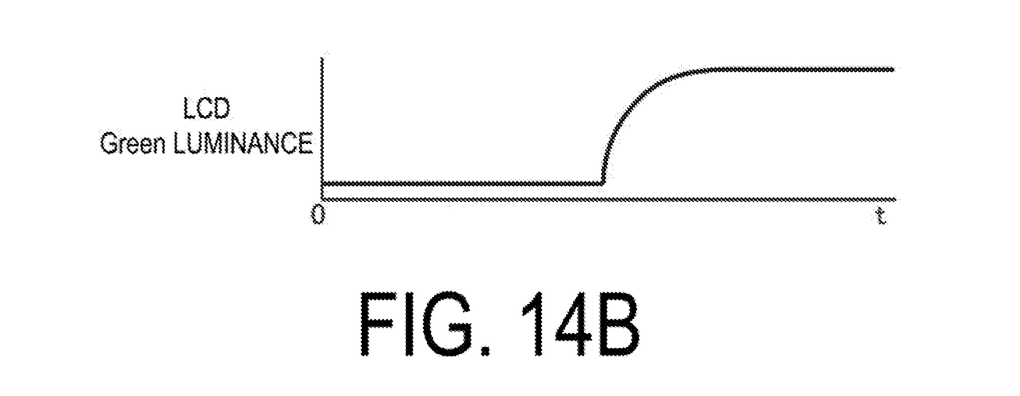
FIG. 14B is a graph showing a change in time in luminance of green light included in emission light of a liquid crystal display device.
Figure 14C:
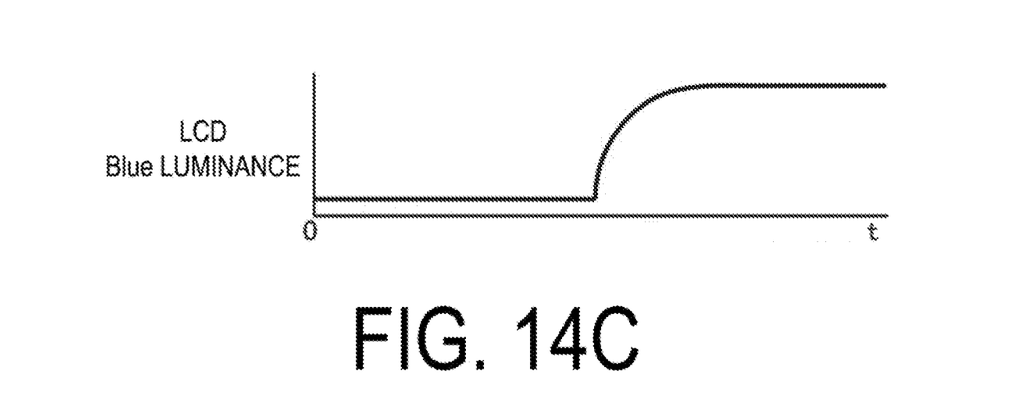
FIG. 14C is a graph showing a change in time in luminance of blue light included in emission light of a liquid crystal display device.

By lowering the gray scale values of the green pixels 22G and the blue pixels 22B in this way, the transmittance of the green light and the transmittance of the blue light transmitted through the liquid crystal panel 20 is reduced. As the result, the luminance of the green light and the blue light emitted from the liquid crystal display device 10 (the display surface of the liquid crystal panel 20) is corrected to be reduced, as illustrated in FIG. 14B and FIG. 14C, to luminance equivalent to the luminance of the red light in FIG. 14A, and the white balance is thus adjusted. As the result, a problem in which the display screen is colored closer to a mixed color of the blue light and the green light is eliminated at the moment (the transition phase T2) when the duty ratio of the luminance light modulation data PWMI rapidly increases, and the change in color level caused by the luminance change based on the image signal can be suppressed.

As described above, the liquid crystal display device 10 according to the present embodiment includes: the liquid crystal panel 20 in which the display pixels 22 including the colored pixels 22R, 22G, 22B of a plurality of colors are arranged; the backlight device 30 including the LEDs 52 and configured to illuminate the liquid crystal panel 20 with light; and the control substrate 90 configured to control drive of the display pixels 22, wherein the control substrate 90 includes: the display data generation circuit 92 configured to generate the gray scale value (the display data) D1 for driving the display pixels 22, based on the image data supplied from the external image signal supply source 100; the PWM change amount detection circuit 93 configured to detect the change in the duty ratio of the PWM signal (the luminance light modulation data PWMI) for modulating the luminance of the light source 52, supplied from the external image signal supply source 100; and the display data correction circuit 94 configured to correct the gray scale value D1, based on the output value of the PWM change amount detection circuit 93.

In this way, the PWM change amount detection circuit 93 is provided to detect the amount of change in the luminance light modulation data PWMI, and thus a change in color level caused at the moment of change in the luminance (the transition phase T1 and the transition phase T2 described above) can be detected. While the transition phase T1 and transition phase T2 are specifically about tens of ms, such instantaneous changes can also be addressed. Then, the display data D1 is corrected, based on the output value of the PWM change amount detection circuit 93 by the display data correction circuit 94, and the corrected display data D2 is generated. As the result, the color level can be appropriately corrected with respect to the change in the color level instantaneously generated. Furthermore, the output value of the PWM change amount detection circuit 93 and the output value of the display data correction circuit 94 are also supplied to the PWM correction circuit 95 for improving the reproducibility of the color, so the color reproducibility can be improved while correcting the color level corresponding to the change in the luminance light modulation data PWMI.

Note that, in the above description, an example is indicated in which the KSF phosphor is used as the red phosphor and the β-SiAlON is used as the green phosphor, but phosphors other than these may be used. Depending on the type of phosphor, the response speed with respect to the excitation light of the light-emitting element is different, so the display data correction circuit 94 preferably corrects the display data D1, based on the response speed of the phosphor to be used.

Other Embodiments

The disclosure is not limited to the embodiments described above and illustrated by the drawings, and embodiments such as those described below are also included within the technical scope of the disclosure.

(1) In the embodiment described above, an example is given in which white LED is achieved by three colors of R, G, B as a light source, but a pseudo white color may be achieved by other colors or combinations.

(2) In the embodiment described above, an example is given in which the display pixels are constituted of three colors of colored pixels of R, G, B, but the display pixels may be configured by other colors and combinations (such as adding W (white) or Y (yellow) in addition to R, G, B to make four colors).

(3) In the embodiment described above, an example is given in which the display data is a gray scale value of 256 gray scale, but other gray scales such as, 64 gray scale or the like may be used. Furthermore, the display data may be display data other than a gray scale value.

(4) In the drive control example 1 and the drive control example 2 described above, an example is given in which the gray scale values of each of the colored pixels before correction are the maximum value of 255, but the embodiment can also be applied in cases that the gray scale value is not the maximum value. In the drive control example 1 and the drive control example 2 described above, an example is given in which the gray scale values of each of the colored pixels before correction are the same 255, thereby displaying a white color (the white balance is adjusted), but each of the gray scale values may not necessarily be the same. Specific gray scale values of each colored pixels associated with white balance adjustment can be changed as appropriate in accordance with individual differences.

(5) In the embodiment described above, an example is given in which the LEDs are driven by PWM light modulation by the pulse signal, but they may be driven by a constant current and the amount of light may be controlled by a change in a current value supplied. In this case, the LED drive unit converts the corrected luminance light modulation data PMWO into constant current drive data and supplies a predetermined current value to the LEDs.

(6) In the embodiment described above, an example of the backlight device as a direct type is illustrated, but an edge light type or the like may be used.

(7) In each of the embodiments described above, the display panel is illustrated as the liquid crystal panel, but the disclosure can also be applied to other types of display panels that utilize light from an illumination device to display images.

The invention claimed is:

1. A display device comprising:
a display panel in which display pixels including colored pixels of a plurality of colors are arranged;
an illumination device including a light source and configured to illuminate the display panel with light; and
a control substrate configured to control drive of the display pixels,
wherein the control substrate includes:
a display data generation circuit configured to generate display data for driving the display pixels, based on image data supplied from an external image signal supply source;
a detection circuit configured to detect a change in luminance light modulation data for modulating luminance of the light source, supplied from an external image signal supply source; and
a display data correction circuit configured to correct the display data, based on an output value of the detection circuit.

2. The display device according to claim 1,
wherein the light source includes a light-emitting element configured to emit a first color, a second color phosphor configured to emit a second color different from the first color by responding to excitation light of the light-emitting element, and a third color phosphor configured to emit a third color different from the first color and the second color by responding to excitation light of the light-emitting element, and
the display data correction circuit corrects the display data, based on a response speed of at least one of the second color phosphor or the third color phosphor with respect to the excitation light.

3. The display device according to claim 2,
wherein the display data correction circuit corrects the display data for driving the colored pixels being a same color as a luminescent color of one of the second color phosphor or the third color phosphor whose response speed is slow.

4. The display device according to claim 2,
wherein the display data correction circuit corrects the display data for driving each of the colored pixels being a same color as the first color and the colored pixels being a same color as a luminescent color of one of the second color phosphor or the third color phosphor whose response speed is fast.

5. The display device according to claim 2,
wherein the first color is a blue color, the second color is a red color, and the third color is a green color, and
the second color phosphor is a red phosphor constituted of a $K_2SiF_6$ phosphor.

6. The display device according to claim 5,
wherein the light source is driven by Pulse Width Modulation light modulation,
the luminance light modulation data is a duty ratio of a Pulse Width Modulation signal for driving the light source by Pulse Width Modulation light modulation,
the display data generation circuit generates display data to be input into the display pixels as gray scale values, based on color information included in the image data, and
the display data correction circuit
corrects to decrease the gray scale value of the colored pixel of the red color in a case where the duty ratio decreases, and
corrects to decrease the gray scale value of the colored pixel of the green color and the gray scale value of the colored pixel of the blue color in a case where the duty ratio increases.

7. The display device according to claim 1,
wherein the light source is driven by Pulse Width Modulation light modulation, and
the luminance light modulation data is a duty ratio of a Pulse Width Modulation signal for driving the light source by Pulse Width Modulation light modulation.

8. The display device according to claim 7,
wherein the detection circuit detects a change in the luminance light modulation data by measuring an amount of change of the duty ratio in a unit time.

9. The display device according to claim 1,
wherein the display data generation circuit generates display data to be input into the display pixels as a gray scale value, based on color information included in the image data.

10. The display device according to claim 1,
wherein the control substrate includes a luminance light modulation data correction circuit configured to correct the luminance light modulation data, based on an output value of the detection circuit and an output value of the display data correction circuit, and
the luminance light modulation data correction circuit outputs the luminance light modulation data corrected, to a light source drive unit configured to drive the light source.

11. The display device according to claim 1, wherein the display panel is a liquid crystal panel.

\* \* \* \* \*